(12) United States Patent
Cote

(10) Patent No.: US 6,319,411 B1
(45) Date of Patent: Nov. 20, 2001

(54) METHOD OF MAINTAINING CLEAN VERTICAL SKEINS OF HOLLOW FIBER MEMBRANES AND SYSTEM THEREFOR

(75) Inventor: Pierre Lucien Cote, Dundas (CA)

(73) Assignee: Zenon Environmental Inc., Oakville (CA)

(*) Notice: Subject to any disclaimer, the term of this patent is extended or adjusted under 35 U.S.C. 154(b) by 0 days.

(21) Appl. No.: 09/414,370

(22) Filed: Oct. 7, 1999

Related U.S. Application Data

(60) Provisional application No. 60/103,665, filed on Oct. 9, 1998.

(51) Int. Cl.[7] .................................................. B01D 65/02
(52) U.S. Cl. ................ 210/636; 210/321.67; 210/321.69
(58) Field of Search ...................................... 210/636, 650, 210/651, 652, 321.67, 321.69

(56) References Cited

U.S. PATENT DOCUMENTS

| 5,248,424 | * | 9/1993 | Cote et al. ........................ 210/636 |
| 5,639,373 | | 6/1997 | Mahendran et al. ............. 210/636 |

FOREIGN PATENT DOCUMENTS

| 8-332357 | 6/1995 | (JP) . |
| 9-075687 | 9/1995 | (JP) . |
| 9-206565 | 2/1996 | (JP) . |

\* cited by examiner

*Primary Examiner*—Robert Popovics
(74) *Attorney, Agent, or Firm*—Alfred D. Lobo

(57) ABSTRACT

This invention teaches a system and method to improve the renewal of water being filtered and to prevent the accumulation of solids within a cassette of multiple vertical skeins of hollow fibers used in membrane filtration.

6 Claims, 9 Drawing Sheets

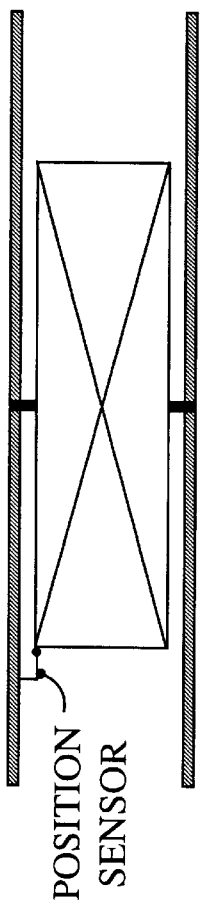
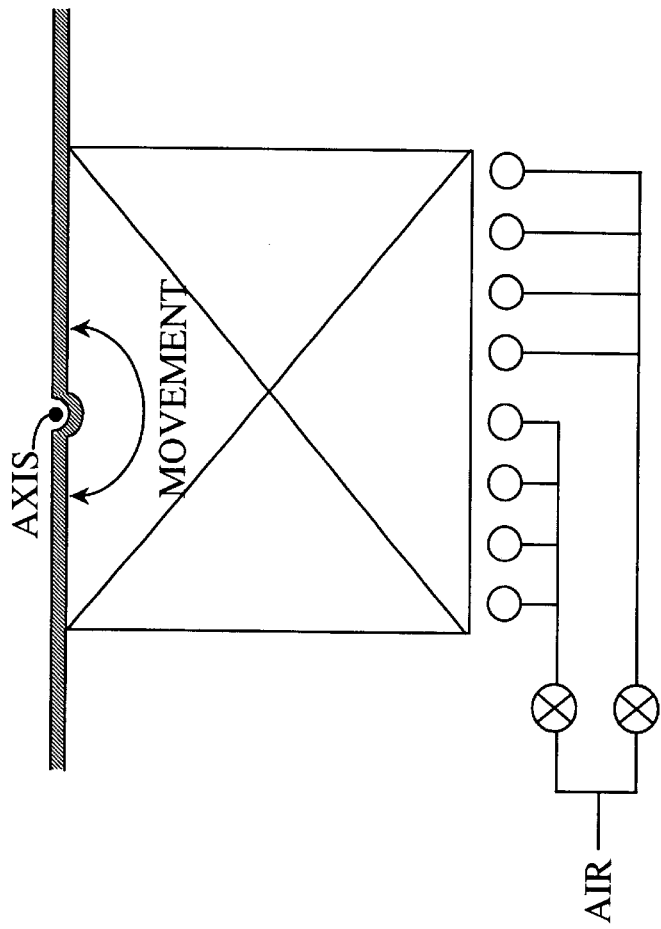

METHOD OF MAINTAINING CLEAN VERTICAL SKEINS OF HOLLOW FIBER MEMBRANES AND SYSTEM THEREFOR

This application is filed subsequent to Provisional Application No. 60/103,665 filed on Oct. 9, 1998.

FIELD OF THE INVENTION

This invention is in the field of filtration of water by micro- or ultrafiltration using hollow fiber membranes ("fibers") in which the direction of filtration is from the outside-in. Particularly when water to be filtered contains a high concentration of suspended solids, filtration causes suspended solids to be carried to the outer surface of the membrane. Though rejected by the membrane, these solids remain on or near the outer surface from which they must be continuously or intermittently removed to maintain filtration at an economic level. The method and system disclosed herein allows one to do so.

BACKGROUND OF THE INVENTION

Though accumulation of solids on the surface of a membrane diminishes permeate flux ("flux", volume of permeate per unit area of membrane per day) in all types of membranes, the severity of the problem is diminished in applications in which water to be filtered is flowed so that it contacts the membrane tangentially. In tangential flow, water to be filtered (referred to as "dirty" water) flows across and along the outer surface of the membrane in well-defined channels, as does the retentate, and the permeate flows through the membrane in a direction orthogonal to the flow of dirty water and retentate. Dislodging solids carried onto the membrane is assisted by this tangential flow as long as flow of dirty water is continuous and relatively fast. Tangential flow occurs with the use of a flat sheet membrane or assembly of flat sheets (such as is shown in U.S. Pat. No. 5,192,456 to Ishida et al., U.S. Pat. No. 4,735,718 to Peteres and U.S. Pat. No. 5,460,720 to Schneider); or with use of a tube type membrane wherein a large diameter tube has a membrane coated on its inner surface, such as is shown in U.S. Pat. No. 4,897,191 to Langerak et al. Transverse flow occurs when filtering with a cartridge of hybrid frameless arrays of fibers or in a module containing an assembly of cartridges, as shown in U.S. Pat. No. 5,182,019 to Cote et al. In general, one expects to encounter less fouling due to build-up of solids on fiber surfaces when the dirty water is flowing transversely to the direction in which the fibers lie, as compared to fouling in tangential flow. However devices are used in which fibers are confined in a shell to provide a well-defined tangential flow, despite the relatively low membrane-packing density in such devices; and such devices consume far more energy than an unconfined vertical skein of fibers.

Vertical skeins of fibers used for "outside-in" filtration without being confined in a shell, offer high membrane-packing density but do not lend themselves to having their surfaces subjected to well-defined tangential flow of dirty water. An unconfined bundle or skein of fibers in a reservoir of dirty water does not provide tangential flow of dirty water and retentate unless aerated so that liquid flows upwards with rising bubbles. However, the velocity of flow of dirty water in tangential flow, parallel to the surface of the membrane, is relatively low unless the skein is subjected to a column of fast-rising air bubbles.

One solution to alleviate the problem of solids accumulation on the surfaces of hollow fiber membranes is periodically backflushing with permeate. This solution is suitable for low concentrations of solids, particularly those solids which do not have a high affinity for the membrane's surface, referred to as "non-sticky" solids. Such non-sticky solids, for example, are inorganic particles of bentonite, silica, talc and organic agglomerates which are not highly hydrophilic. However, even with such non-sticky solids, the frequency of backflushing increases in proportion with the concentrations of solids, so that the amount of water used for backflushing makes the process less economically attractive.

Another solution to the problem of accumulating solids on the surfaces of hollow membranes comprises backblowing air under pressure through the membrane and periodically flushing the outer surfaces of the membranes with a stream of high velocity water as disclosed in patents assigned to Memtec U.S. Pat. Nos. 5,643,455 and 4,935,143 to Kopp et al. This solution of backblowing air is suitable for skeins of hollow fibers held in a restrictive containment vessel and the dirty water contains a relatively low concentration of solids.

Yet another solution consists in scrubbing the solids from the surfaces of slack fibers between fixed upper and lower headers of a vertical skein with a continuous flow of coarse air bubbles as disclosed in U.S. Pat. Nos. 5,639,373 and 5,783,083 to Mahendran et al. Scrubbing a stationary skein of fibers with a column of rising air bubbles, is economical when it is practiced on an assembly of vertical skeins, but the skein is required to have slack fibers critically spaced-apart so that individual fibers are circumferentially sealed by potting resin in opposed headers. The manner in which the fibers are potted so as to be individually sealed in a film of surrounding resin is not critical so long as the fibers are spaced apart to ensure an essentially leak-proof header. Such an assembly of vertical skeins is referred to herein as a "cassette" and it is known that a cassette is an expedient structure for the deployment of vertical skeins, generally. In a cassette, multiple skeins from 2 to about 20 or more, preferably from about 4 to 10, are secured in a framework. The framework may be rectangular and may have vertical skeins with either cylindrical or rectangular parallelpiped headers secured in the framework. For maximum density, cylindrical skeins may be secured in a generally cylindrical framework. For simplicity and convenience, the description herebelow is specifically directed to a cassette in which from 6 to 8 skeins with rectangular parallelpiped headers, each skein comprising multiple, generally planar arrays of hollow fibers, spaced apart in the headers by flexible spacing means, and having a specified amount of slack. The skeins are assembled side-by-side, sequentially, along the longitudinal axis (x-axis) of the cassette, the arrays of each skein lying in the transverse direction (y-axis) in a vertical plane.

From the foregoing, and knowing that translating a single vertical skein to-and-fro, into and out of a vertical column of air bubbles generated by a stationary diffuser necessarily diminishes the exposure of fibers in the skein to the scrubbing action of the bubbles, it was surprising to find that using a cassette and oscillating it with specified limited displacement at specified frequencies, imparts the requisite motion which minimizes the build-up of solids within each skein of the cassette, and between adjacent skeins thereof. Hence, the particular solution disclosed herein to the problem of solids build-up, is particularly adapted to a shell-less cassette of skeins of hollow fibers immersed in liquid to be filtered.

Solutions to prevent solids build-up or to facilitate their removal from a module of hollow fibers, have been disclosed in the following Japanese patent applications which teach agitating the module:

JPA H9-075687 filed on Sep. 14, 1995 by Kurita Water discloses a module formed from hollow fibers woven as a screen placed horizontally in a tank and air bubbles rise from under the screen. The screen is raised and lowered to obtain uniformity of distribution of air bubbles and purports to change the direction of air bubbles with the membranes. Raising and lowering the screen with fibers in the horizontal plane, generates a transverse flow of dirty liquid being filtered relative to the surfaces of the membranes being moved vertically.

JPA H9-206565 filed on Feb. 2, 1996 by Kurita Water teaches a screen type module of hollow fibers subjected to air bubbles rising from beneath the module. The screen type module includes opposed frames, one of which is vertically movable relative to the other. During filtration, the vertically reciprocable frame is moved up and down while the other frame is stationary. As in the prior Japanese disclosure, relative tangential flow is generated by the vertically moving screen type module.

In each of the foregoing disclosures a single module is used, and it is translated through the water to be filtered while the module is confined in a tank in such a manner as to effectively provide transverse flow of water across the length of the hollow fibers. As stated in each disclosure, enhancement of filtration efficiency is evident in a single module because of the effectively transverse flow. In contrast, no improvement in filtration is evidenced in a single vertical skein because the flow of water, dictated by the velocity of the bubbles rising vertically, is essentially parallel to the surfaces of the vertical fibers and is not in transverse flow.

JPA H8-332357 filed on Jun. 6, 1995 by Toray teaches cleaning a module of hollow fiber membranes by vibrating the module while back-washing it. Vibrating the module varies the water level and helps remove solids dislodged during back-washing thus cleaning the surfaces of the fibers. The vertical configuration of fibers in a module is maintained during its reciprocation while backwashing; this causes movement of the water to clean the surfaces of the fibers. Improvement in efficiency is attributed to each module being confined in a shell.

The present disclosure is specifically directed at improving the effectiveness of an assembly of multiple vertical hollow fiber skeins (referred to as a "cassette") which, during operation, is immersed in a relatively large and unrestrictive reservoir. Such a cassette is referred to herein as "shell-less" because it is not confined in a shell which directs flow of fluid to be filtered in one direction. In a cassette, the flow of permeate is essentially parallel to the bubble-generated flow of substrate to be filtered, and the fibers are subjected to essentially tangential flow during filtration. When oscillating, that portion of the cassette on each side of its vertical central axis is aerated continuously, such aeration being switched from one side to other.

SUMMARY OF THE INVENTION

It has been discovered that providing a cassette with limited oscillating motion at specified frequencies in an unrestrictive reservoir, allows filtration at a higher flux for a specified fouling rate than is obtained with a stationary aerated cassette; the benefit of higher flux derives not only from the movement of individual fibers into, and out of relatively solids-free zones within the liquid to be filtered, but generates constantly changing random patterns of scrubbing bubbles which are highly effective to minimize the formation of clumps of solids within a skein. The cassette is preferably oscillated about its central transverse axis, preferably located above the skeins, and quite unexpectedly, in the best mode, the gas generating means provides gas with enough energy to lift one side of the cassette while the gas scrubs the skeins on that side, so that no additional energy is required. The arc through which the cassette travels effectively converts a portion of the tangential flow to which the fibers are subjected, to flow with a essentially non-tangential, substantially transverse component. In the cassette, flow of permeate through the fibers is parallel to the bubble-generated vertical flow of liquid substrate to be filtered only when the angulating vertical axis of the oscillating cassette passes through the central vertical axis.

It is therefore a general object of this invention to provide a method for removing solids accumulated upon the outer surfaces of fibers in multiple vertical skeins assembled in a shell-less cassette immersed in water containing suspended solids, said method comprising;

i) concentrating solids within each skein by creating a differential pressure across walls of the fibers of each skein, and generating a substantially vertical flow of permeate through the fibers;

ii) generating enough bubbles with sufficient velocity to induce an essentially vertical flow of dirty water on both transverse sides of each skein, thus renewing the supply of water, the average velocity of such flow being in the range from about 0.05 to 1.0 m/sec;

iii) generating an oscillating movement of the cassette about its lateral transverse axis, in an amount sufficient to promote the transport of solids from within each skein into the vertical flow of water on both sides of the skein, preferably at a frequency in the range from 4 secs to 10 min; frequency refers to the time the cassette spends on each side of the vertical axis.

In a preferred embodiment the aforesaid device comprises: i) an assembly of vertical skeins, preferably symmnetrically disposed about a transverse axis (in the y-direction) for oscillation thereabout; ii) bubble-means for inducing a vertical flow of water upwards or downwards on both sides of the skein, and substantially parallel to the fibers; and, iii) means for inducing said oscillation.

Specific objects of this invention are: (A) to provide a cassette adapted to be immersed in an unrestrictive reservoir of dirty water and pivotable disposed about a central transverse axis located above the skeins; first and second bubble-generating means symmetrically disposed beneath the cassette; and, means to supply each bubble-generating means alternately with sufficient air to provide enough lift to only one half of the cassette, whereby the cassette is oscillatable about the central transverse axis; and, (B) to determine a maximum tolerable fouling rate at which a stationary cassette may be operated and the flux at which such fouling rate occurs; and, operating an oscillating cassette at the same fouling rate but at a higher flux, or, operating an oscillating cassette at the same flux but a lower fouling rate.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which:

FIG. 4(a) schematically illustrates a top plan view of a cassette mounted for oscillation about a transverse central axis above the skeins;

FIG. 4(b) schematically illustrates a side elevational view of the cassette shown in FIG. 4(a), and also symmetrically disposed bubble-generating means beneath the cassette, which bubble-generating means are alternately supplied with air to generate lift on each side of the cassette;

DETAILED DESCRIPTION OF PREFERRED EMBODIMENTS

Figure 1:
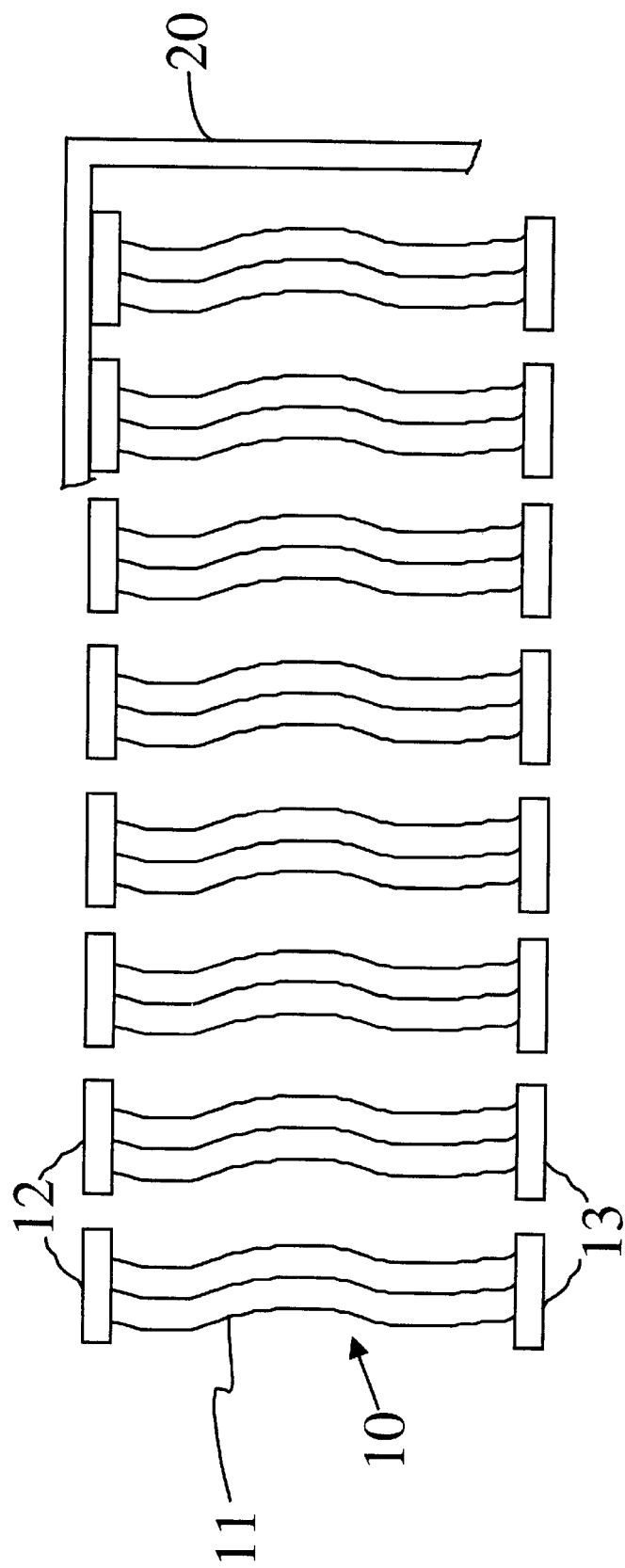
FIG. 1 schematically illustrates eight (8) vertical skeins disposed in side-by-side relationship in a rectangular framework (not shown)

For an illustrative comparison, in the first experiment, dirty water is filtered with a cassette of vertical skeins which is operated while being subjected to a column of air bubbles rising from a pair of diffusers near the base of the fibers, and the skein is moved horizontally to-and-fro, in and out of the rising columns of bubbles while being held in an upright position. In the next experiment, the same skein, freshly cleaned, is operated in a vertical position while being aerated with the same aerators generating essentially identical columns of bubbles (size, velocity and mass flow of air), except the skein is not moved. The equilibrium flux of the skein at the end of a 96 hr period for each experiment is measured and compared.

In greater detail, a single, freshly chemically and mechanically cleaned vertical skein having critically spaced-apart, slack fibers potted in opposed headers shaped as rectangular parallelepipeds, is translated in dirty water having a solids content (finely divided bentonite) of 15 g/L, with a to-and-fro motion along a longitudinal axis (x-axis) orthogonal to the vertical plane in which lie multiple arrays of potted fibers which form the skein. The thickness of resin which surrounds each fiber so as to maintain it in spaced-apart relationship with an adjacent fiber is not narrowly critical provided the thickness is sufficient to seal individual fibers against leakage of dirty water into the fiber. A film of sealing resin may be as little as 5 $\mu$m but is generally more, in the range from about 50 $\mu$m to 5 mm, the larger the spacing, the less dense the skein. A convenient width of the skein (measured along the x-axis) is one which is potted so as to seal the fibers without difficulty, typically about 10 cm and includes plural arrays of spaced-apart fibers, typically 50 arrays. In addition to all fibers being spaced apart by resin, to ensure that all fibers in each array are reliably sealed in opposed spaced-apart upper and lower headers, each array is preferably spaced-apart from an adjacent array by a spacing means, preferably a flexible strip. On either side of the lower header is a diffuser from which emanates a continuous stream of air bubbles in a size in the range from about 1 mm to about 5 cm generated by air at a pressure of 170 kPa (10 psig) though any pressure in the range from about 135 kPa (5 psig) to about 240 kPa (20 psig) may be used so as to generate a flow of bubbles rising along the outer surfaces of the fibers in the dirty water at a velocity in the range from about 10 cm/sec to about 50 cm/sec. The skein is attached to a reciprocable piston and reciprocated so as to move it out of the column of bubbles, on each side of the central vertical axis (x-axis) of the skein, alternating at a frequency of 5 times per minute, that is 5 times out of the column on one side, and 5 times out of the bubbles on the other side, each minute. The skein is thus displaced sufficiently so as to be outside the central portion it occupied above the diffusers. While the skein is moving, essentially the same amount of tangential flow over the skein is converted to transverse flow. The equilibrium flux is measured after 96 hours.

In the second experiment, the same vertical skein, again freshly chemically and mechanically cleaned, is placed in the same dirty water having a solids content of 15 g/L, with the same diffusers operating identically as before, except that the vertical skein is stationary. The equilibrium flux is again measured after 96 hr.

The equilibrium flux of the stationary vertical skein is higher than that of the reciprocating skein. The reason is attributable to moving the skein from directly above the columns of bubbles being generated by each diffuser, and denying the skein the benefit of the major portion of the scrubbing action of the bubbles which now serve only to generate an upward flow of dirty water while aerating a zone in the water from which the skein was moved. One would therefore not expect that moving a skein or cassette of multiple skeins so as to deprive it (the skein or cassette) of continuous exposure to scrubbing bubbles would reap the benefits which were derived only in a stationary, continuously aerated skein.

Referring to FIG. 1 there is illustrated an assembly of 8 vertical skeins, each indicated generally by reference numeral 10, each having 22 arrays of 1,650 mm long fibers 11, each 2 mm in diameter and spaced apart so as to have a centre-to-centre spacing of about 3 mm, potted in opposed upper and lower rectangular parallelepiped headers 12 and 13 respectively. Each skein is relatively thick (2–10 cm) in the longitudinal direction (x-axis) of the cassette in which individual skeins, each comprising multiple arrays, lie in the transverse direction (y-axis), with air diffusers located on either side of each skein in the cassette so that air flows upward (z-axis). The headers are each about 732 mm long (measured along the y-axis) and 180 mm in width (measured along the x-axis). Adjacent headers are spaced apart at 5 cm from one and another and secured in the rectangular base of a structural steel cassette (only a broken-away portion is shown) indicated generally by reference numeral 20, which cassette has overall dimensions of about 1,700 mm (x-axis)× 732 mm (y-axis)×2,050 mm (z-axis). The rectangular volume within the cassette is referred to as the zone within the cassette, or the "cassette zone". During filtration of dirty water, solids tend to accumulate within individual skeins, between fibers thereof, and between adjacent individual skeins. The object is to remove accumulated solids not only from within each skein, and from between adjacent skeins, but from within the cassette zone.

The air flow that is distributed at the base of each skein plays two roles:

1) it creates turbulence on both sides of the skein while agitating the slack fibers to remove solids from within the skein;
2) it generates an airlift circulation pattern in the tank to carry the solids outside of the cassette through the spaces between skeins; by alternating air flow to one side of the cassette and then the other, the air flow generates enough power to lift one side of the cassette, then the other.

The following example illustrates the demand imposed upon hollow fiber membranes in a ZW-4000c cassette having fibers with an average pore size of 0.1 $\mu$m and 370 $m^2$ of membrane area operating at an equilibrium flux of 30 L/hr/$m^2$: under typical operating conditions, filtering sludge having a concentration of 15 g/L, 4000 kg of dry solids are carried into the skeins of the cassette every 24 hr.

Figure 2:
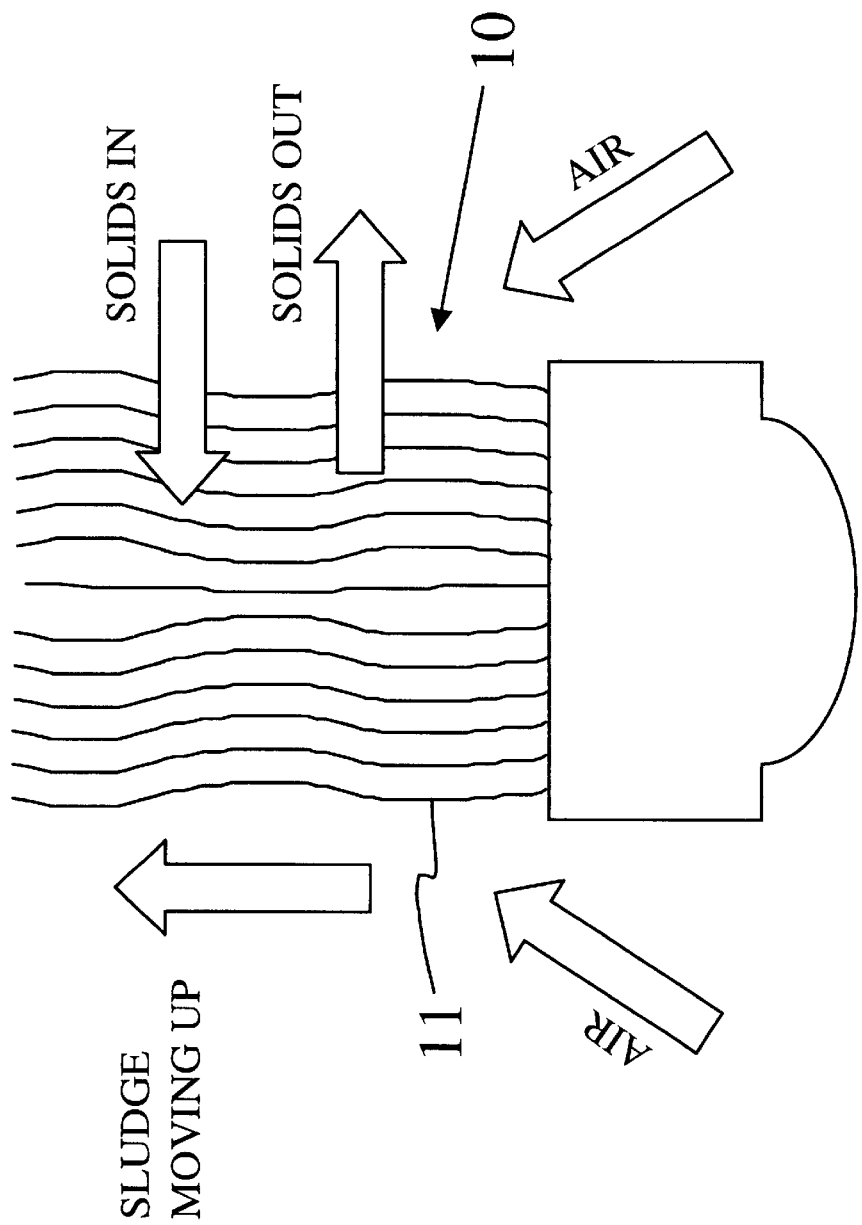
FIG. 2 diagrammatically illustrates mechanisms for the removal of solids in a stationary vertical skein.

FIG. 2 illustrates the lower portion of a skein which is subjected to bubble-induced flow of liquid the major portion of which is in a vertical direction, but minor, substantially negligible portions of which are in other directions. Natural flow of air is upward and there is very little horizontal driving force to remove solids deposited within each skein. The solids carried into the skein by filtration must thus be removed by turbulence-induced-dispersion and fiber movement, a rather inefficient process. For this process to work properly, a difficult compromise must be found between many design and operating variables.

Design variables:

| | |
|---|---|
| fiber slack | maximize to improve removal of sludge from skein; minimize to reduce fiber fatigue; |
| fiber packing density | maximize to reduce cost; minimize to improve removal of sludge from skein. |

Operating variables:

| | |
|---|---|
| water flux | maximize to reduce cost; minimize to reduce solids flux into the skein; |
| air flow rate | maximize to improve removal of solids from the skein; minimize to reduce fiber fatigue and energy cost. |

The invention is based on decoupling the removal of the solids from within each skein of the cassette, and evacuation of the solids from within the cassette; such solids removal is attributed to oscillating the cassette.

The removal of solids from within the skein is effected through agitation of the cassette, by an oscillating movement about a central transverse axis through the cassette, which movement causes substantially vertical fibers to move along an arcuate path. Such movement promotes penetration of the liquid and air mixture inside the skein, as illustrated in FIG. 3.

Figures 3A, 3B:
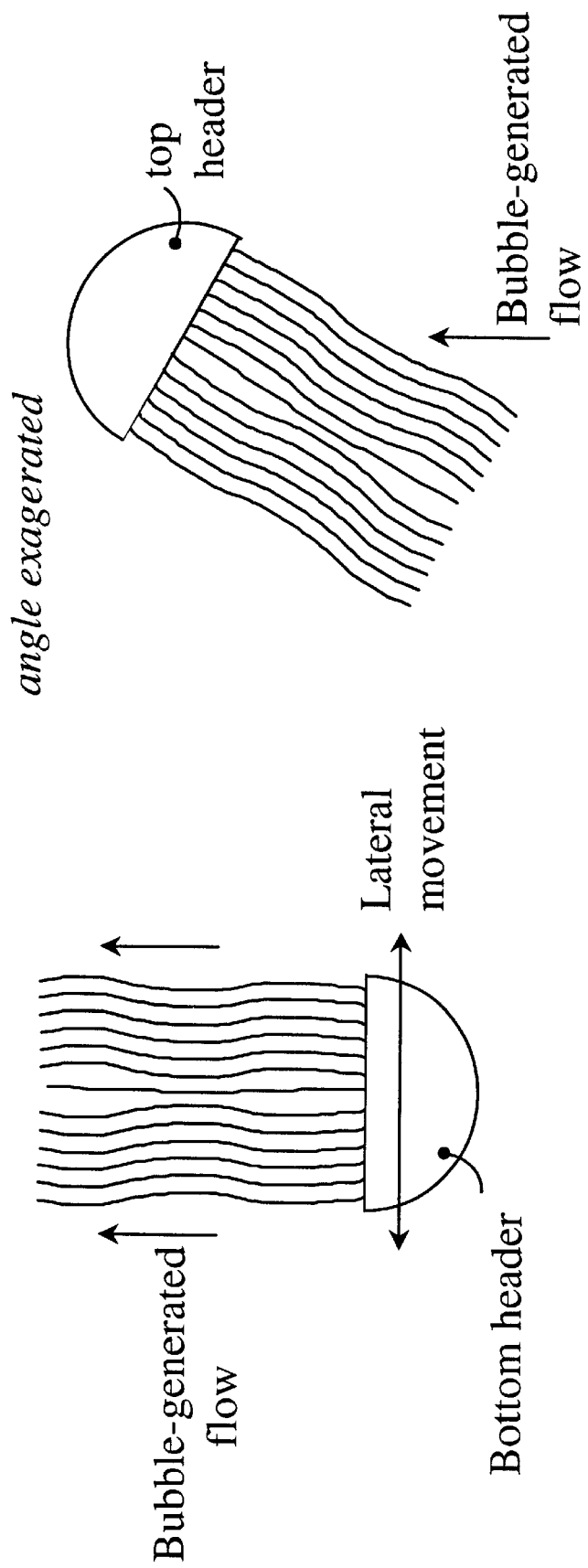
FIG. 3(a) diagrammatically illustrates a broken-away portion of a single skein in a cassette to show how solids are removed from within and between adjacent skeins of the cassette when it is laterally and linearly reciprocated.
FIG. 3(b) diagrammatically illustrates a broken-away portion of a single skein in a cassette to show how solids are removed from within a skein which is oscillated in a vertical plane about a transverse axis.

FIG. 3a shows how a back-and-forth movement of each skein can induce a horizontal flow component (or transverse flow component) of the liquid and air mixture. The direction of the back-and-forth movement is lateral (that is, in the longitudinal or x-axis direction) and normal to the vertical plane in which each skein lies. To be efficient, the displacement of the cassette should be at least equal to, and preferably, larger than the thickness (measured along the x-axis) of the thickest skein in the assembly, i.e. 4 to 20 cm. Such displacement requires an input of a relatively large amount of energy in addition to that provided by the air bubbles.

FIG. 3b shows how oscillation promotes penetration of the liquid and air mixture flow into the skein. The axis of rotation for the oscillation movement is about the transverse axis lying in a horizontal plane. It can be located anywhere, within or outside the cassette, but would preferably be in the vertical plane of symmetry of the cassette, or a group of interconnected cassettes, above its center of gravity. The oscillation movement can be induced mechanically, or using the drag force of air, by cycling the air flow (or part of) on either side of the axis.

A typical system to oscillate a cassette is showed in FIG. 4. In this system, cycling air flow is used to induce oscillation and its cycling frequency preferably corresponds to the natural oscillation frequency of the cassette. To that end, actuation of the air valves can be controlled by a position sensor (represented on the top view). Though the entire lift required on each side is most preferably provided by air, if desired, a portion of the lift may be provided by pumps which alternately renew water on both sides of the skein by inducing a flow upwards or downwards, as required.

Solids discharged from the cassette are evacuated with a pump, mechanical agitator or airlift induced flow in the space provided between skeins in the cassette.

The air diffusers can be an integral part of the cassette or independent of the cassette and located a certain distance directly below the cassette. If the diffusers are an integral part of the cassette and therefore move with the cassette, they are most preferably of the "closed type", (e.g. perforated rubber sleeve mounted over a 2" perforated pipe). If the air diffusers are independent of the cassette, they can be of either the "closed" or "open" type and a shroud or a skirt must be added between the diffusers and the cassette to contain the air stream and direct it towards the spaces between skeins.

An estimation of the required frequency of cassette movement can be done based on the hypotheses used above (370 $m^2$/cassette, flux of 30 L/hr/$m^2$, sludge concentration of 15 g/L). For the extreme case—if all solids carried by the filtered liquid stayed in the skeins—the concentration of solids in the skeins would increase by about 30% in one minute (i.e. from 15 to 20 g/L). So, if the cassette movement is used as the principal means for solids removal from within the skein, its frequency should be equal to or larger than one per minute to maintain the solids concentration within the skein below 1.3 as compared to the average concentration in the tank.

Since the effective equilibrium flux obtained by moving a vertical skein horizontally in and out of a rising column of fiber-scrubbing bubbles was found to be less effective than the equilibrium flux when the skein is stationary, the unexpected result-effectiveness of oscillating a skein, and a cassette in particular, through an arcuate path, was quantified against a stationary cassette subjected to the same aeration, alternating from one side to the other, over the same extended period of time, using essentially identical cassettes and aeration conditions.

Figure 5A:
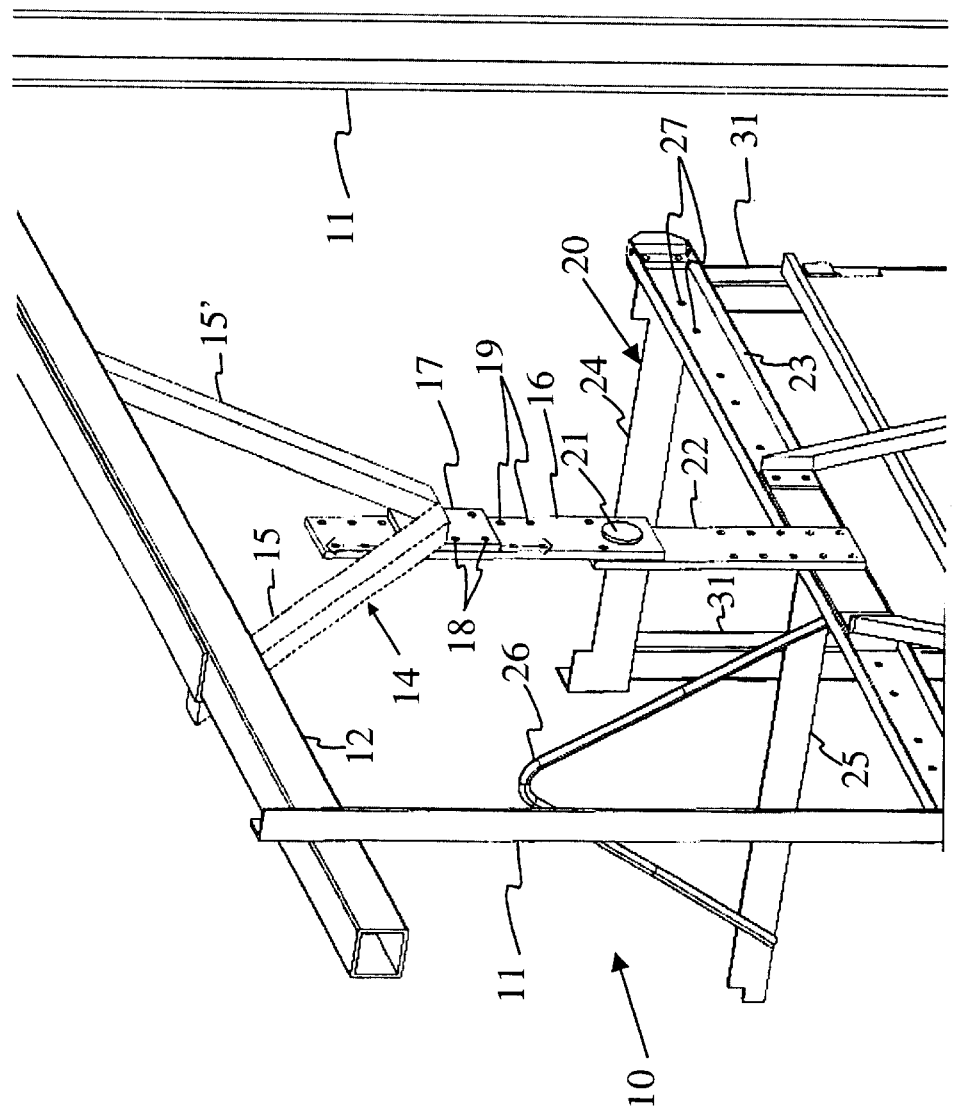
FIG. 5(a) diagrammatically illustrates a perspective view of the top of a framework of a cassette mounted as stated in FIG. 4(a)
Figure 5B:
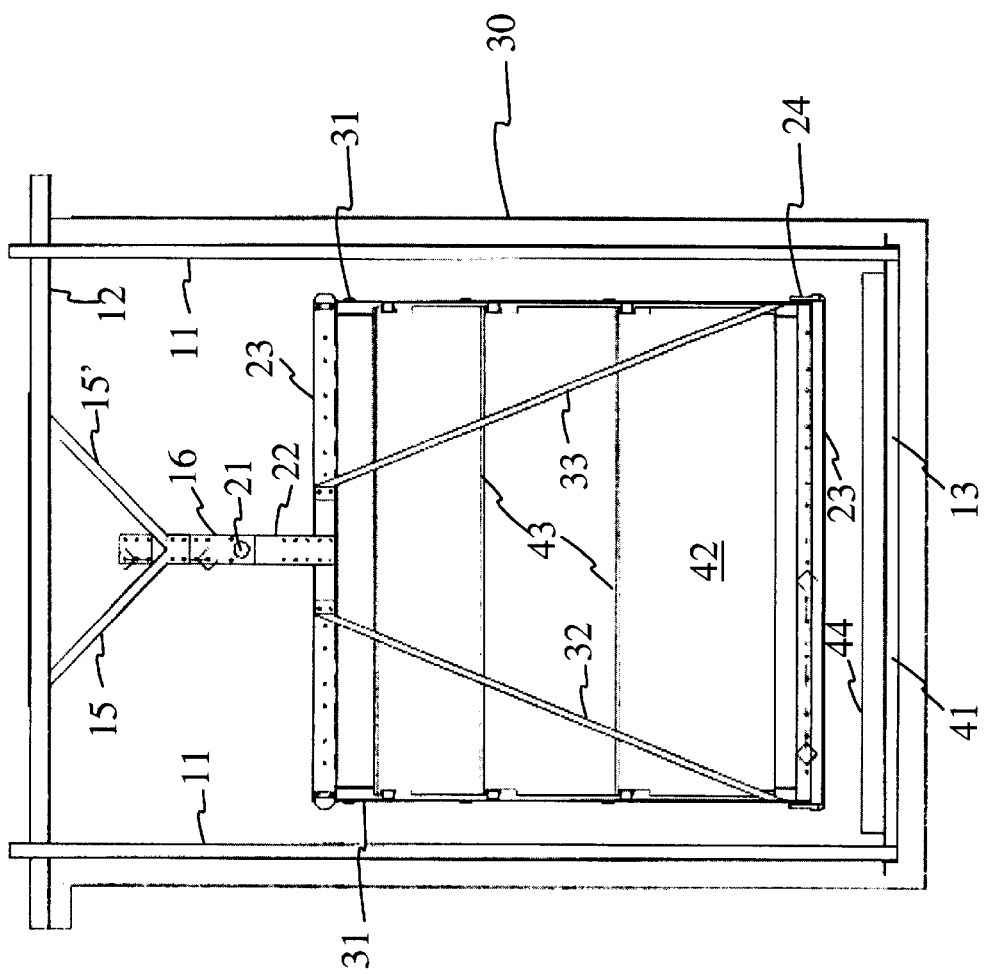
FIG. 5(b) diagrammatically illustrates a side elevational view of the cassette shown in FIG. 5(a), locked in a stationary operating position above the bubble-generating means as described in FIG. 4(b) above.
Figure 5C:
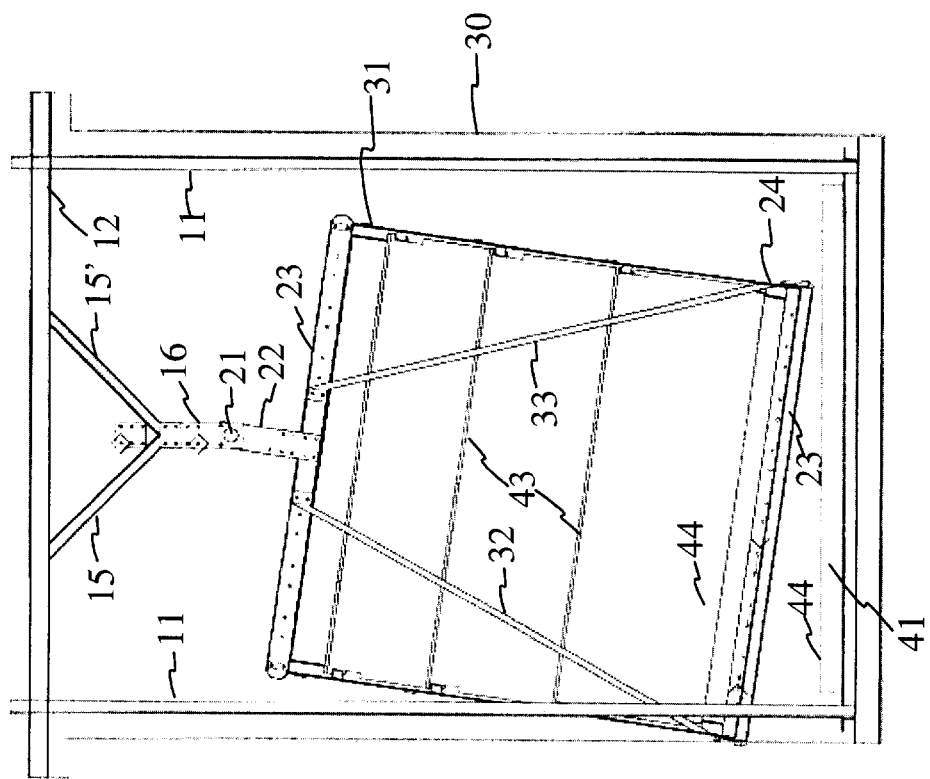
FIG. 5(c) diagrammatically illustrates a side elevational view of the cassette shown in FIG. 5(a), at the high end of an oscillation to one side while the cassette oscillates above the bubble-generating means as described in FIG. 4(b) above.

Referring to FIG. 5(a) there is illustrated a perspective view of the top of a framework, referred to generally by reference numeral 10, within which plural skeins (not shown) are held in a sub-frame 20 to form a cassette of vertical skeins (not shown), which cassette is immersed in a large tank 30, shown in FIGS. 5(b) and 5(c), of water to be filtered. The framework 10 comprises four vertical right-angle struts 11 located at the corners of a rectangular parallelpiped, the vertical struts being located and held in position by upper and lower box-channel connecting struts 12 and 13 respectively, as shown in FIGS. 5(b) and 5(c). Upper struts 12, one spaced apart from the other by the width of a header, rest on the top of the walls of the tank 30. Each strut 12 is provided with a V-shaped yoke 14 having arms 15 and 15' to locate and stabilize a pair of suspension struts 16 (only one of which is shown) which are secured to a mounting block 17 secured to the apex of the V-shaped yoke 14. Spaced apart parallel rows of through-passages 18 in mounting block 17 correspond to rows of through-passages 19 provided in the suspension strut 16 for bolts (not shown) which allow the cassette to be immersed to a desired depth which is adjustable.

Near the lower end of each opposed strut 16 of sub-frame 20 is a low-friction pivot pin 21 on which each of a pair of opposed suspension struts 22 (only one is shown) is pivotably disposed for pendulum-like oscillation through a chosen arc in the range from about 5° to 35°, measured on either side from the vertical center line through the pivot pin 21. The transverse axis through the pivot pins is located above the upper headers of the skeins, the location depending upon the size of the tank, the desired range of arcuate motion and the dimensions of the skeins. In a cassette of skeins having fibers about 3 m long, the pivot pin is from about 30 cm to about 36 cm above the upper headers. The amplitude of arcuate motion is chosen as a function of the relative size of the cassette and tank, and design variables listed above, provided that, in operation, some of the skeins of the cassette are always being scrubbed by rising bubbles. In a typical tank, the arc is through which suspension strut 22 moves is preferably in the range from 10° to 20° so that more than half the skeins in the cassette are always aerated whether the cassette is on one side or the other.

The pair of suspension struts 22 support an upper rectangular frame comprising a pair of opposed side rails 23 (only one is shown) held apart by a pair of spaced-apart end rails 24 (only one is shown) and a central strut 25 to which is secured a lifting link 26. Each side rail 23 has through-passages 27 for securing skeins, side-by-side, within the sub-frame. The upper rectangular frame is connected to a corresponding lower rectangular frame having side rails 23 and end rails 24, with four vertical frame members 31 located at each corner of the rectangular frames. Reinforcing struts 32 and 33 connect the central portion of the side rails 23 of the upper frame, on each side, to the lower ends of the vertical frame members 31 so that the lower frame is rigidly connected to the upper frame forming an open reinforced stainless steel cage within which the skeins are securely positioned.

Beneath the cage is located an aeration grid about 20 cm to 40 cm below the cassette, the grid including aerators 41 under each side of the cage, constructed so that the aerators are supplied with enough air so that the upward forces exerted by both water and air lift the cassette to one side of the vertical, then the other, each side for a predetermined period of time. The cassette is suspended high enough above the aerators 41 so that the lower end of the oscillating cassette does not damage the aerators when the cassette reaches its high point on the opposite side. Switching the air from one side of the aeration grid to the opposite side at predetermined intervals produces the desired oscillations. The aerators 41 may be of any conventional design which will supply bubbles in the desired size range rising at a desired velocity.

To guide and direct the rising bubbles, each side of the cage is provided with a pair of opposed shrouds or screens 42, one on either side of the cassette to provide a bubble zone. The shroud 42 is preferably a sheet of plastic secured near its side edges to the vertical frame members 31 so as to allow open fluid communication between the skeins in the cassette, and the water in the tank 30, the water flowing into and out of the bubble zone between the shrouds through the top, bottom and sides of the bubble zone. Reinforcing struts 43 extend longitudinally between the vertical frame members to stiffen the cage and keep the shroud from bulging.

To help channel the bubbles from the aerators beneath the cassette into the bubble zone between the shrouds 42, the aerators are provided with an air baffle 44 which extends upwards for a distance sufficient guide the bubbles into the bubble zone. The baffle 44 is about 30 cm in width, measured along the vertical axis, extending upward from the aerators towards the side rail 23 of the lower rectangular frame. The shroud is preferably about 10 cm wider than the cassette, so that there is at any time about 5 cm clearance on each side between each of the shrouds on the sub-frame and each end of the headers.

If the oscillating cassette yields a desirably high flux at a very low fouling rate even when insufficient air is supplied to lift the cassette on each side, and the cost of additional air to provide the oscillations is not justified, they may be provided with a fluid-actuated piston which pushes the cassette to swing it back-and-forth, or an eccentric shaft rotatably driven by an electric motor, or any other mechanical means.

Referring to FIG. 5(b) there is diagrammatically illustrated a side elevational view of the framework 10 in which a stationary cassette is shown, analogous to one schematically illustrated in FIG. 4(b). In the runs described below the sub-frame was locked in a vertical position.

Referring to FIG. 5(c) there is diagrammatically illustrated a side elevational view of the framework 10 in which the cassette is shown at one high-point of its swing.
Experimental procedure:

Results of using an oscillating cassette versus a stationary one, are quantified by controlling the gradual fouling of the membranes in a cassette of eight ZeeWeed 500 modules, each module comprising a pair of skeins operatively connected together, the fibers having an average pore size of about 0.1 $\mu$m, each module having a membrane area of 500 ft$^2$ (46.5 m$^2$). The cassette is suspended in a tank 2.7 m long×2.7 m wide×3 m high; the tank is filled with a suspension of bentonite having a particle size in the range from about 1 to 5 $\mu$m, the solids content of the suspension being 1.5 g/L.

Oscillation of the cassette is produced by supplying air to one side of the cassette for a specified period, then shutting off the air to that side and switching the supply of air to the opposite side of the cassette. The switching of air supply is made substantially instantaneously, so that the cassette swings from one extreme position to the other in a very short time, less than 2 sec. As the cassette swings from side to side, water on both sides of the skeins is renewed by inducing a substantially vertical flow upwards or downwards, and simultaneously dislodging solids accumulated between the fibers. The vertical flow is generated by the air, though a pump may be used to enhance vertical flow, at least a portion, and preferably all vertical flow, is provided by the air. Oscillation converts a large enough portion of the vertical flow to transverse flow, such portion being sufficient to promote the transport of solids from within skeins into the water outside the cassette.

Three sets of runs are made with the cassette oscillating at frequencies of 4 sec/4 sec, 6 sec/6 sec and 10 sec/10 sec. Each set of runs is made under the same experimental conditions and with the same procedure. Each run commences by withdrawing permeate at a low flux which is kept constant for 30 min defining a first plateau, during which 30 min period trans-membrane pressure differentials (TMP) are followed. Thereafter successive runs are made step-wise, at incrementally higher fluxes each higher flux maintained for 30 min, the skeins being backwashed for 30 sec at the end of each 30 min period. Seven incrementally different levels of flux, defining seven plateaux, are maintained in a set of runs for each oscillation frequency.

Figure 6:
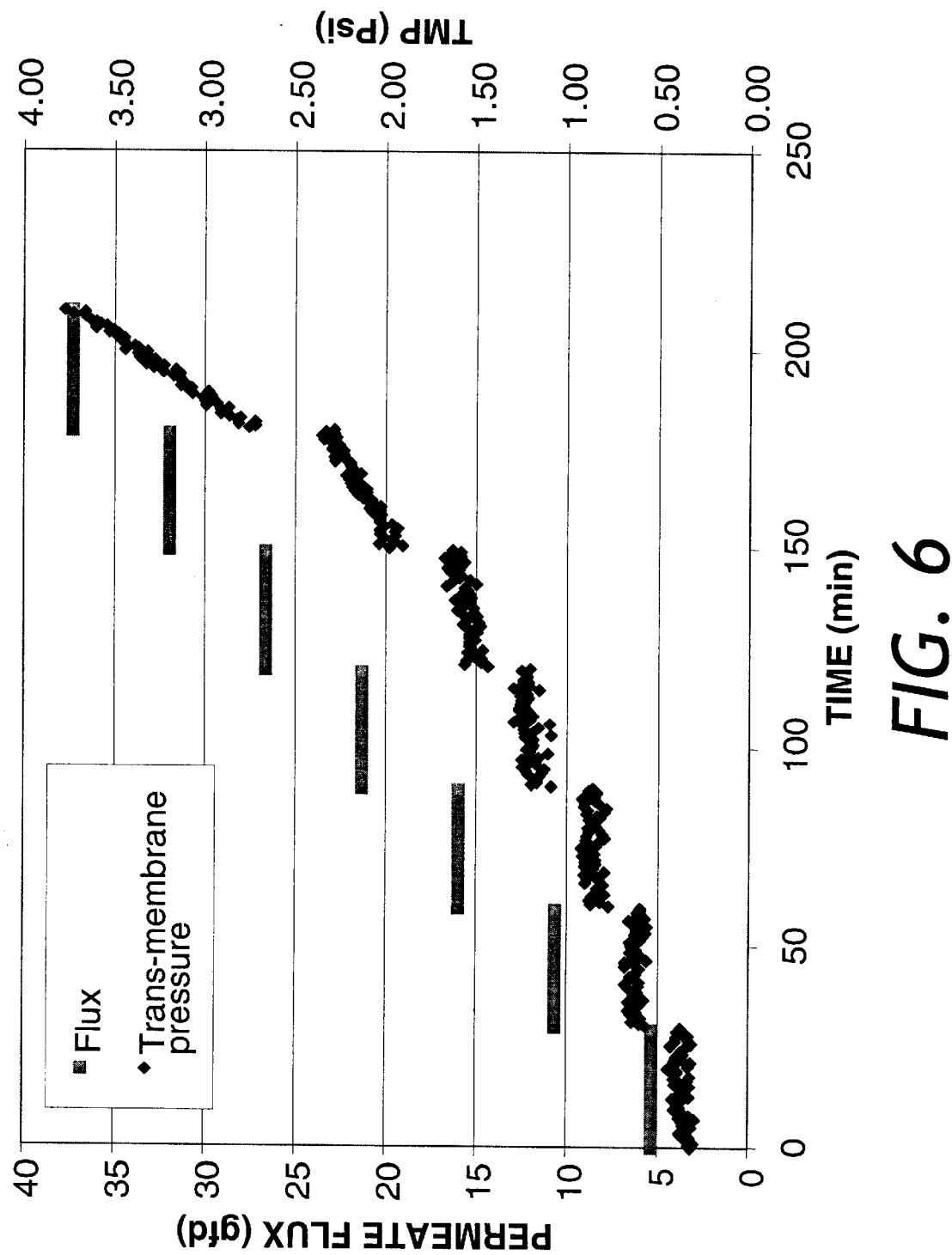
FIG. 6 is a graph in which permeate flux and transmembrane pressure differential (TMP) are each plotted against time in seven incremental steps, each at a higher flux maintained for 30 min, for a cassette oscillating at a frequency of 6 sec, that is 6 sec of aeration on one side, followed by 6 sec of aeration on the opposite side.

Each increased level of flux dictates an increase of the quantity of matter flowing by convection towards the modules. Therefore, the rate of the increase of TMP will increase as the permeate flux is increased. For each plateau, the rate at which the TMP increases as a function of time defines a particular fouling rate (measured in each of these runs in psi/min). The results of the three sets of runs, one for each frequency, and the results for the stationary cassette, showing the corresponding rises in TMP at each plateau are shown in FIG. 6. Note the steeper slope of the TMP at progressively higher fluxes.

Figure 7:
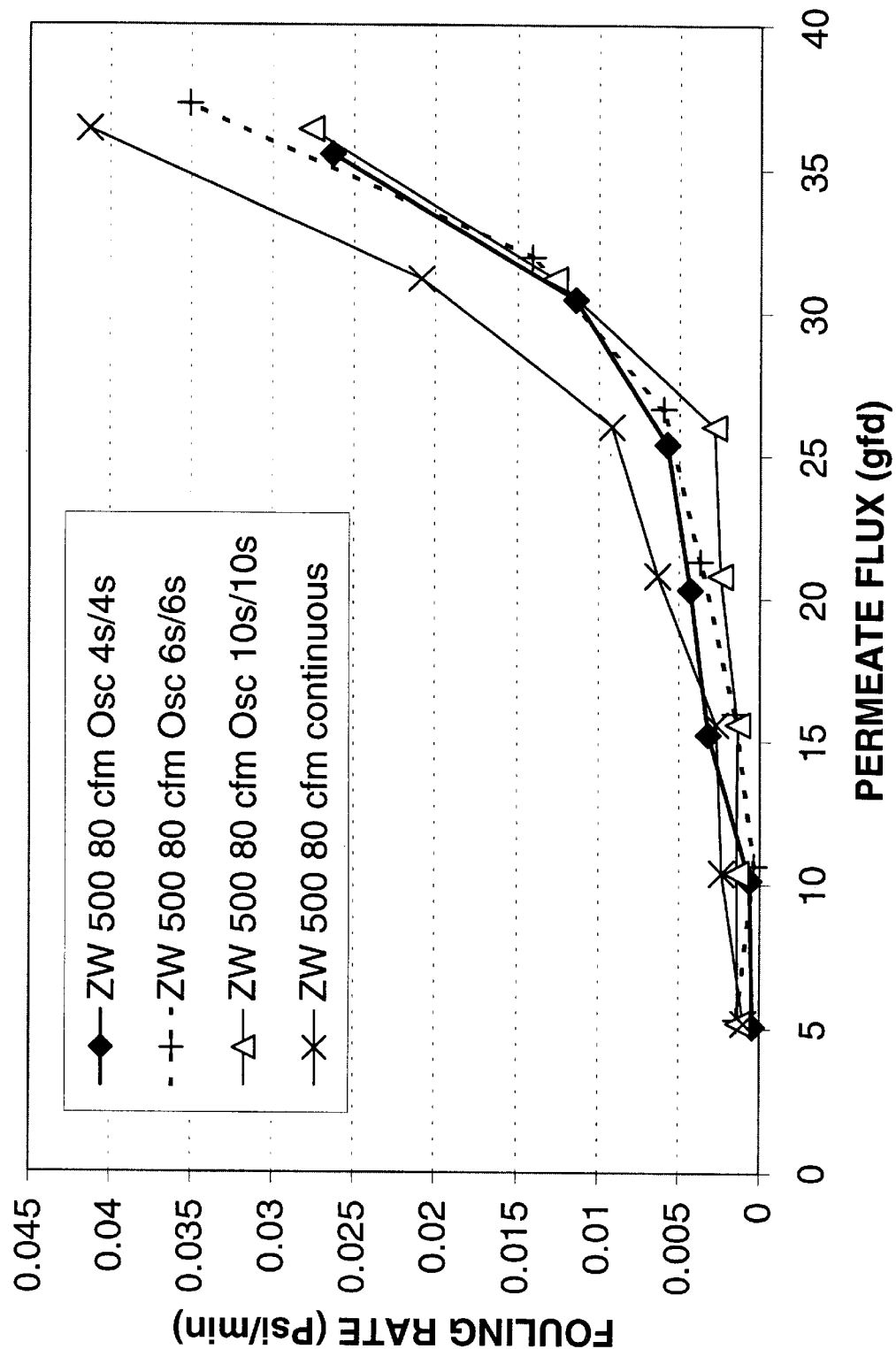
FIG. 7 is a plot of fouling rate against flux, each fouling rate being determined by the slope of the TMP at a particular flux (plateau), for cassettes operating at various frequencies.

Referring to FIG. 7 there is shown a graph in which the results of the three sets of runs, one for each frequency, and the results for the stationary cassette, are presented after calculating the fouling rate corresponding to the rises in TMP at each plateau. For each oscillation frequency, the fouling rates (represented by the slope of the TMP lines) at each of the seven plateau in FIG. 6 are plotted against the corresponding flux at which each fouling rate was calculated for that frequency.

The evidence indicates that, for filtration of a suspension of micronized bentonite, an aerated oscillating cassette provides only a small advantage over a stationary one at low flux, in the range from about 1 to 15 gals/ft$^2$/day (gfd), insofar as the fouling rate for the latter is only slightly higher, irrespective of the frequency. However, operating at a higher flux, above 20 gfd it is evident that the rate of fouling is lower with the oscillating cassette though it operates at the same flux as if it was stationary.

From the graph it is seen that at 20 gfd the fouling rate with the stationary cassette is about $6 \times 10^{-3}$ psi/min while with the oscillating cassette the fouling rate is about $4.5 \times 10^{-3}$ psi/min. The about 33% decrease in fouling rate allows less frequent backwashing and more efficient and economical filtration. At a higher flux of 35 gfd, the fouling rate with the stationary cassette is about $3.7 \times 10^{-2}$ psi/min while with the oscillating cassette the fouling rate is about $2.7 \times 10^{-2}$ psi/min and the fouling rate is still about one-third lower for the oscillating cassette.

Moreover, results at a frequency of oscillation which is less than about 1 min and specifically in the range from about 4 sec to about 30 sec, are relatively closely grouped, indicating that the transverse flow generated at various frequencies within the range is sufficient to obtain the observed decrease in fouling rate. It is expected that as frequencies increase, that is, a cassette being held at one extreme end of its oscillation for more than about a minute will not produce comparably low fouling rates.

The foregoing data indicates that one may determine the maximum fouling rate at which filtration is economical with the stationary cassette, then operate the cassette in an oscillation mode at that fouling rate yet obtain a higher flux; an alternative is to operate the oscillating cassette at the same flux obtained with it in the stationary mode, but with about one-third less fouling.

The maximum fouling rate is critical to the economics of a commercial filtration as it determines backwashing frequency, the intensity of the backwash and its duration, and associated costs. It should be recognized that the foregoing illustrative example is experimentally carried out with bentonite, and that the physical and chemical characteristics of other fouling agents will result in greatly differing economies related to operating at a chosen flux at a fouling rate characteristic for a specific fouling agent. However, it is evident that oscillating an aerated cassette at relatively high frequency provides an unexpected benefit over operating the stationary cassette.

What is claimed is:

1. A method for removing concentrated solids from within a vertical skein of shell-less, immersed hollow fiber membranes used for the filtration of water containing suspended solids, said method comprising;

i) assembling multiple skeins in side-by-side relationship in a cassette in an unrestrictive reservoir, each skein comprising multiple generally parallel arrays of vertical fiber membranes;

ii) concentrating solids within skeins of the cassette by creating a differential pressure across walls of the hollow fibers to filter the water flowing in tangential flow, parallel to the surface of the membranes; and, iii) generating an oscillating movement of the cassette about its central transverse axis located above the skeins causing the cassette to travel in an arc, at a frequency sufficient to renew water around the skeins by inducing a substantially vertical flow of the water upwards or downwards through the skeins, and flow of permeate through the fibers parallel to the bubble-generated flow when the angulating vertical axis of the oscillating cassette passes through the central vertical axis.

2. The method of claim 1 where at least a portion of vertical flow is induced by gas generating means located beneath the skeins and frequency is sufficient to promote the transport of solids from within skeins into the water surrounding the skeins.

3. The method of claim 2 including providing additional vertical flow induced by a pump or a mechanical agitator.

4. The method of claim 1 where the vertical flow corresponds to an average velocity of between 0.05 to 1.0 m/sec.

5. The method of claim 1 where the frequency of oscillation is in the range from about 4 seconds to 1 minute on each side of the vertical axis.

6. The method of claim 1 wherein oscillation is through an angle in the range from about 5° to 35° on either side of the vertical axis.

* * * * *